United States Patent [19]
Cimbalik et al.

[11] Patent Number: 5,332,313
[45] Date of Patent: Jul. 26, 1994

[54] NOZZLE MIXER ASSEMBLY

[75] Inventors: David J. Cimbalik; Daniel N. Kemp; Timothy W. Mitin; Christopher C. Shirk, all of Midland, Mich.

[73] Assignee: Dow Corning Corporation, Midland, Mich.

[21] Appl. No.: 30,962

[22] Filed: Mar. 12, 1993

[51] Int. Cl.⁵ .............................. B01F 5/00; B05B 7/04
[52] U.S. Cl. ................................. 366/303; 366/309; 366/168; 366/173; 239/432
[58] Field of Search .......................... 239/10, 398–400, 239/402, 427, 428, 429–434; 222/145; 366/302, 303, 309, 312, 325–329, 168, 173

[56] References Cited

U.S. PATENT DOCUMENTS

| | | | |
|---|---|---|---|
| 199,474 | 1/1878 | Sprague | 366/328 |
| 617,983 | 1/1899 | Dietrich | 366/328 |
| 3,329,410 | 7/1967 | Rothert | 366/326 |
| 3,482,822 | 12/1969 | Krizak et al. | 366/303 |
| 4,766,176 | 8/1988 | Lee et al. | |
| 4,805,154 | 2/1989 | Schneider | 366/303 |
| 4,976,547 | 12/1990 | Hisanaga et al. | 366/303 |
| 5,017,654 | 5/1991 | Togashi et al. | |
| 5,098,669 | 3/1992 | Kawanami et al. | 366/303 |
| 5,121,992 | 6/1992 | List et al. | 366/303 |

*Primary Examiner*—Karen B. Merritt
*Attorney, Agent, or Firm*—Roger H. Borrousch

[57] ABSTRACT

A nozzle assembly (24) for filling a container with a homogeneous mixture of viscous liquids includes a housing (28) having an inner passageway (40) extending therethrough defining a longitudinal axis (42) of the housing (28) and an axially rotatable drive shaft (44) supported by the housing (28) and extending through the passageway (40) along the longitudinal axis (42). A folding mechanism includes stationary pins and moving pins mounted tangentially relative to a centrally disposed drive shaft (44) disposed along the longitudinal axis (42) for folding the liquids flowing through the passageway (40) while preventing columns of unmixed liquid from flowing axially along the drive shaft (44).

15 Claims, 3 Drawing Sheets

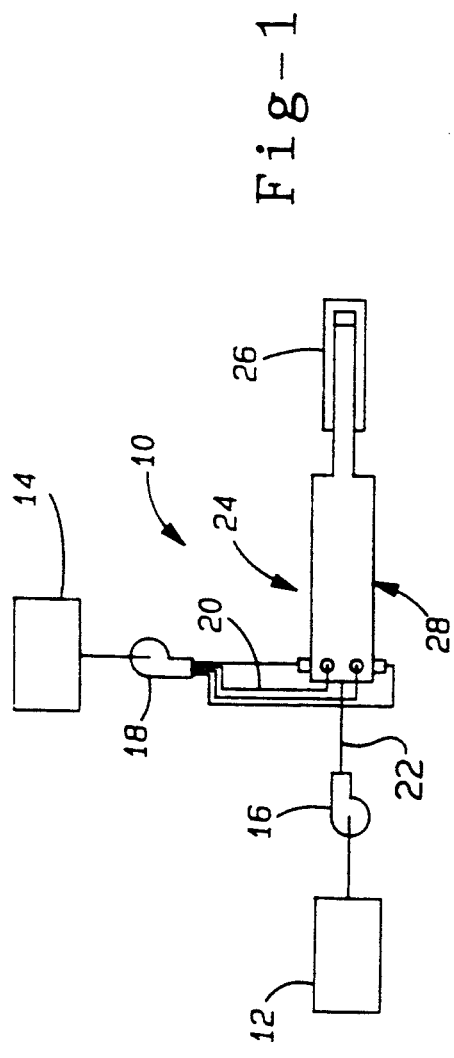
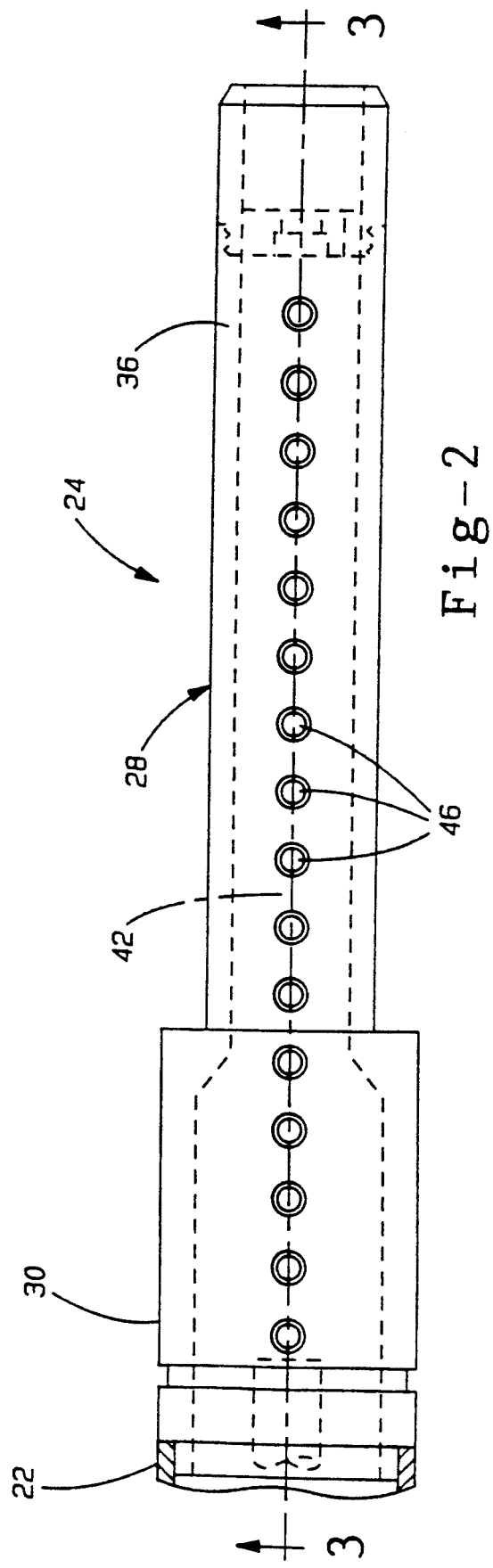

NOZZLE MIXER ASSEMBLY

TECHNICAL FIELD

The present invention relates to a nozzle assembly for filling a container with a homogeneous mixture of viscous liquids. More specifically, the present invention provides a nozzle assembly which can eject a volume of a highly viscous material, such as a sealant while simultaneously folding into the sealant a highly viscous second fluid, such as a coloring agent for imparting a color to the volume of highly viscous materials.

BACKGROUND OF THE INVENTION

In the manufacture of colored sealants, it has become desirable to mix coloring agents with the sealant as close as possible to the area of packaging of the material. This is referred to as "point of packaging" pigmentation. The general idea is to mix pigment into the base sealant at the last possible moment before filling a package, such as a cartridge, tube, drum, or other container. In these types of processes, a clean-up would be limited to the pigment mixing process at the end of the production line.

Currently, processes for coloring sealants involve frequent changeovers from color to color. First, the base sealant is compounded using known technology, catalyzed, and packaged in drums or bulk containers. The containers are moved to a separate color production process area for pigmentation. Many different color pigments are needed in order to make the variety of colors and shades required by the market place. Matching a specific desired color can require sophisticated blending of a number of pigments. Typically, production personnel load the base sealant into a large mixer, and meter the necessary coloring agent into the mixer to produce a desired colored sealant. The ingredients are mixed for a given time and checked for a good color match using standard colorimetry technology. The addition of pigment must be limited because the pigment can cause degradation of the physical properties of the sealant if it exceeds a certain concentration.

When the color of the sealant is determined to be correct, the sealant is moved to a proportionating machine where the sealant is dosed into cartridges, drums, or pails through the use of a one-part volumetric dosing system. When the packaging is completed, the mixer blade, mixer can, proportionating machine and dosing system must all be cleaned for the next run. Approximately 10% of the batch is lost in the cleaning process.

The above-mentioned systems generally include an injection nozzle. As material is pumped through the injection nozzle, a volume of material is formed within the nozzle which over time passes through the nozzle and exits to fill containers.

Nozzles have been developed in the urethane foam dispensing arts which utilize a mixing shaft operatively disposed within the nozzle for producing mixing during an injection process. These shafts can include projections extending radially outwardly therefrom, appearing to be disposed in a cross-wise fashion extending from the center shaft when viewed in cross-section. Examples of such machines are low pressure two-component foam processing machines and nozzles manufactured by Edge-Sweets of Grand Rapids. Mich. Widen adapting such mixing nozzles to pigmenting sealants, the high viscosity of the sealant as well as the high viscosity of the pigments create mixing problems.

As stated above, the injected base material passes through the nozzles as a predetermined volume in the form of a column. The volume of material is initially a highly viscous heterogeneous mixture of materials. What is required is the mixing of the pigment, which is also highly viscous, into a homogeneous mixture with the highly viscous volume of sealant. It has been found that using the aforementioned nozzles having mixing shafts therein results in inadequate mixing of the highly viscous fluids. This is caused by adhesion of the highly viscous sealant to the mixing shaft as it passes therethrough as the cross-wise pins extending therefrom can define undisturbed columns of material which can travel along the shaft without being folded into the pigment and vice versa. Further, such machines, if sped up, produce shearing which increases temperature of the material. Increased temperatures are to be avoided as the increased temperatures can cause curing and other chemical modifications to the material. Such shearing is a dispersive type of mixing, similar to a grinding effect. With highly viscous materials, a folding-type mixing which is distributive, is desired which maintains a low temperature of the materials while thoroughly mixing the two materials together.

A further consideration of the present invention is that a small amount of pigment, less than 10% by weight of the total weight of the material, is required to be mixed in homogeneously throughout the length of the volume of sealant being ejected from the nozzle. Hence, folding which may begin at one end of the nozzle must be completed to homogeneity before it is injected from the other end of the nozzle and this must be done consistently throughout the length of the volume of material being ejected.

The present invention provides a dynamic mixing process which is designed to minimize clean-up and maximize the speed in changing from color to color while the entire mixing process is performed within the nozzle assembly of the present invention.

SUMMARY OF THE INVENTION

In accordance with the present invention, there is provided a nozzle assembly for filling a container with a homogeneous mixture of two or more different viscous liquids, the assembly including a housing having an inner passageway extending therethrough and defining a longitudinal axis of the housing. An axially rotatable drive shaft is supported by the housing and extends through the passageway along the longitudinal axis thereof. Folding means folds the liquids flowing through the passageway while preventing columns of unmixed material from flowing axially along the drive shaft.

The present invention further provides a method of filling a container with a homogeneous mixture of viscous liquids, the method including the steps of pumping a first liquid through a passageway of a housing having an axially rotatable drive shaft supported by the housing and extending through the passageway along a length of the longitudinal axis of the passageway and folding the liquids flowing through the passageway while preventing columns of unmixed material from flowing axially along the drive shaft.

BRIEF DESCRIPTION OF THE DRAWINGS

Other advantages of the present invention will be readily appreciated as the same becomes better understood by reference to the following Detailed Description when considered in connection with the accompanying Drawings wherein:

FIG. 1 is a schematic representation of a liquid injecting assembly made in accordance with the present invention;

FIG. 2 is a longitudinal view of the nozzle assembly of the present invention;

DETAILED DESCRIPTION OF THE INVENTION

Figure 3:
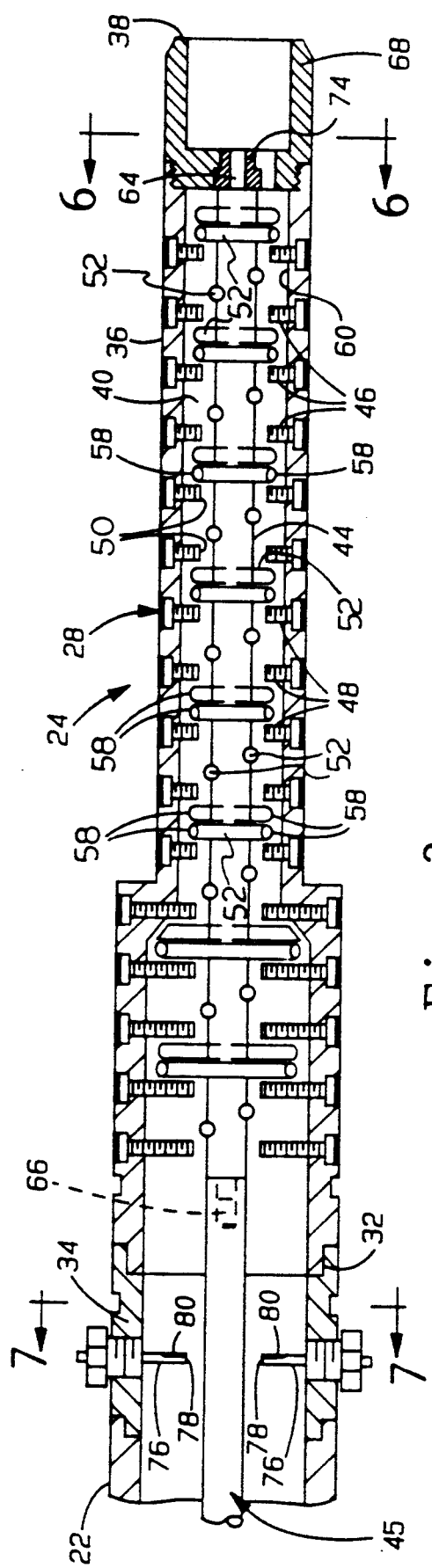
FIG. 3 is a cross-sectional view taken along lines 3—3 of FIG. 2.

A liquid injecting assembly for simultaneously mixing and injecting at least one highly viscous liquid into a second highly viscous liquid is generally shown at 10 in FIG. 1. As schematically shown, the assembly includes a first liquid source 12 of the type for containing a highly viscous liquid, such as a sealant composition.

Silicone sealants comprise a polydiorganosiloxane, a filler, a crosslinker, and sometimes a curing catalyst. The silicone sealants are generally those which cure by exposure to moisture and are viscous materials which can be extruded from cartridges into cracks or crevices to be sealed. The consistency of the sealants is usually viscous and toothpaste-like. In applications such as building construction, sealants need to be thixotropic and non-sagging so that they remain in place until they cure. Because silicone sealants are used in building construction, aesthetics are very important which means that the color of the sealant is also very important. Therefore, silicone sealants of a variety of colors are required and matching the color for specific building materials is desired.

Silicone sealants are made by mixing the various ingredients in defined weight or volume ratios. For room temperature vulcanizable silicone sealants, the polydiorganosiloxanes are often endblocked with silanol or hydrolyzable groups. The polydiorganosiloxanes have viscosities most often greater than 1 Pa.s when measured at 25° C., such as from 1 to 100 Pa.s. When the filler is added to the polydiorganosiloxane, optionally plasticizers or filler treatments, the resulting mixture is often called a base material because it makes up the majority of the resulting sealant and because other ingredients are added to it to make the final sealant compositions. The fillers can be divided into two major categories, reinforcing fillers such as silicas, carbon blacks, and certain very finely divided calcium carbonates, and non-reinforcing or extending fillers such as calcium carbonate, titanium dioxide, quartz, diatomaceous earth, and alumina.

To the base material, the crosslinkers and catalysts are added. The crosslinkers are conventionally silanes or partial hydrolysis products of the silanes. These silanes include acetoxysilanes, alkoxysilanes, ketoximosilanes, aminosilanes, and amidosilanes. The crosslinking silanes can have three or four hydrolyzable groups per molecule and the partial hydrolysis products usually have more than three hydrolyzable groups per molecule. In addition to crosslinkers, the sealants may include chain-extenders which are silanes which have two hydrolyzable groups per molecule. The hydrolyzable group terminating the polydiorganosiloxanes can be the same as those of the silane crosslinkers, but mixtures of different kinds of hydrolyzable groups can be present in the same sealant composition.

Catalysts for curing the sealant compositions depend upon the kind of crosslinker and include metal carboxylates, alkyl ortho titanates, titanate chelates, zirconium alkoxides and chelates. The particular catalyst used with a particular crosslinker is well-known in the silicone sealant art and further information can be found in that art.

In addition to these ingredients, coloring agents can be added. These coloring agents (commonly called pigments) include the inorganic pigments which impart color to the sealant, organic compounds which impart color to the sealant, and combinations of different coloring agents. For the present invention, the coloring agents need to be in a liquid state. To achieve the liquid state, a colorant or coloring agent may require a liquid carrier in which it is dispersed. Besides the above ingredients, sealants can include heat stability additives, flame retardant additives, fungicides, thixotroping agents, and surface modifying agents.

Although the nozzle assembly of this invention is designed to mix and deposit silicone sealants into a cartridge, other sealants which are made up of a mixture of ingredients and are made by a process which lends itself to mixing and immediate packaging into cartridges may find this nozzle assembly an advantage. Besides sealants, other kinds of materials which might have relatively high viscosity and which are made up of multiple ingredients may also find this nozzle assembly useful for manufacturing and packaging.

For example, addition curable compositions which comprise an alkenyl functional polydiorganosiloxane, an organopolysiloxane having silicon-bonded hydrogen atoms and a platinum catalyst may be made using this nozzle assembly. In this kind of composition, the platinum catalyst is separated or rendered inactive at room temperature to provide compositions which are storage stable in the package. The platinum can be rendered inactive by the use of an inhibitor or can be encapsulated, such as described in U.S. Pat. Nos. 4,766,176, issued Aug. 23, 1988, to Lee et al. and 5,017,654, issued May 21, 1991, to Togashi et al. which are hereby incorporated by reference to show such composition.

A second liquid source is shown at 14. The assembly may include a single second liquid source 14 or may include a plurality of liquid sources which are supplied for being mixed with the liquid from the first liquid source 12. Pumping mechanisms schematically shown at 16 and 18 pump the liquids through conduits, schematically shown at 20, 22. The conduits 20, 22 convey the liquids from the first and second liquid sources 12, 14, or from a plurality of liquid sources, to a nozzle assembly generally shown at 24. The nozzle assembly 24 is of the type for injecting a mixture of the liquids into a standard sealant cartridge 26 in FIG. 1.

Referring more specifically to FIGS. 2 and 3, the nozzle assembly 24 includes an housing generally shown at 28. The housing 28 includes an inlet end 30 having a recessed portion 32, as shown in cross-section in FIG. 3, for connection to a pigment injection adapter 34 which is discussed in more detail below. The adapter 34 can then be connected to the conduit 22 for receiving the first liquid or, in the case of a sealant mixture, the base sealant from the first liquid source 12.

The housing 28 includes a second portion 36 which has a reduced outer diameter relative to the inlet end 30 which allows for the outer surface of the second portion 36 to receive a cartridge thereover. As material is ejected from end portion 38 of the housing 28, the cartridge 26 is filled while simultaneously being forced off of the second portion 36.

As shown in FIG. 3, the housing 28 includes an inner passageway 40 extending therethrough and defining a longitudinal axis, as shown by broken line 42. Generally, an axially rotatable drive shaft 44 is supported at one end by a prime mover drive shaft 45 and extends through the passageway 40 along the longitudinal axis 42. A folding mechanism folds the liquids flowing through the passageway 40 while preventing columns of unmixed liquid from flowing axially along the housing 28, as well as drive shaft 44. That is, the assembly 24 includes a folding mechanism which continuously folds the volume of material being pumped therethrough with an additive, such as a pigment, along the length of the nozzle assembly 24, the folding causing an effective dispersion, as described below, resulting in an homogeneous mixture of the sealant ejected from the ejection end portion 38 of the housing 28 which is also homogeneous with the additional material being ejected therefrom.

More specifically, the folding mechanism includes a plurality of stationary pin members 46 disposed along the passageway 40 and extending into the passageway 40 from the housing 28. As shown in the Figures, the stationary pins 46 can be in the form of bolt or smooth pin members which are mounted on and through the housing 28 along the length thereof or can be welded directly to the housing. The stationary pins 46 can include threaded portions 48 extending into the passageway 40 or they can include smooth portions (not shown). Although the orientation of the pins relative to each other can be adjusted, in the preferred embodiment the pins are spaced around the diameter of the housing 28 such that they are 90° apart. That is, when viewed in cross-section, there are four pins along any length of the housing 28, the pins being spaced about the circumference of the housing by 90°. The ends 50 of each pin 46 is proximate to but spaced from the drive shaft 44.

Figure 5:
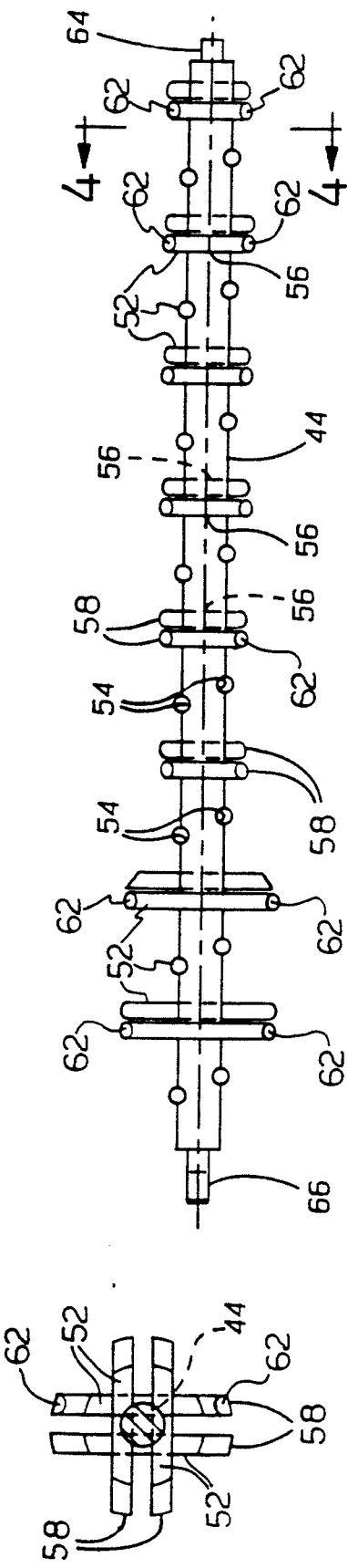
FIG. 5 is a longitudinal view of the isolated drive shaft having the mounting pins mounted thereon.
Figure 4:
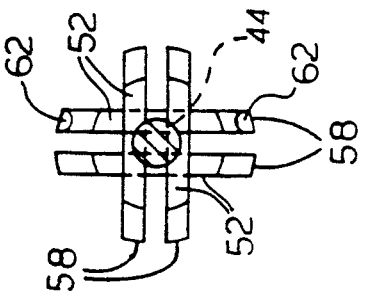
FIG. 4 is a cross-sectional view taken substantially along lines 4—4 of FIG. 5.

The folding mechanism further includes moving pins 52, as shown in FIGS. 3–5. The moving pins 52 are disposed along the drive shaft 44 and extend into the passageway 40. The moving pins 52 are mounted on the drive shaft 44 at an attachment point in a plane generally tangential to the drive shaft 44. In this manner, the moving pins 52 produce a sweeping action as the drive shaft 44 rotates so as to not only fold the liquid materials passing through the passageway 40, but also cooperate with the stationary pins 46 to effectively fold the material in its entirety, breaking up any adhesion the material has to the drive shaft 44 while also preventing any unmixed columns of material from traveling along the drive shaft 44 through the passageway 40 during the mixing process. The combination of the stationary pins 46 with the moving pins 52 which are offset tangentially relative to the longitudinal axis 42 results in effective folding of the material. Effective folding is obtained to produce a homogeneous mixture ejected from the end 38 of the housing 28 without resulting in the elevated temperatures of the material produced by shearing mixing processes. Hence, the present invention obtains an effective distributive folding process as opposed to a dispersive process resulting from a shearing action of the material.

The drive shaft 44 defines a length along the longitudinal axis 42. In a preferred embodiment, the moving pins 52 are disposed along that length of the drive shaft 44 in a pairwise fashion, as shown in FIGS. 3 and 5. Each pin 52 has an adjacent pin 52 extending parallel therewith but also spaced axially therefrom. That is, each pair of the moving pins 52 include two substantially parallel moving pins 52 spaced from each other by the drive shaft 44, each pair of the moving pins 52 being substantially perpendicular relative to each adjacently disposed pair of moving pins 52 so as to appear in an H pattern, as shown in cross-section in FIG. 4. The "H" includes two pins which are parallel and spaced apart by the shaft member 44 including an adjacent pair of pins which are rotated 90° relative thereto, the adjacent pair of pins also being spaced apart by the drive shaft 44. Additionally, as shown in FIGS. 3 and 5, each pair of pins 52 are axially spaced relative to each other along the length of the drive shaft 44.

As best shown in FIG. 3, there is a specific orientation of the stationary pins 46 relative to each pair of moving pins 52. The stationary pins 46 are disposed along the housing 28 between each of the pairs of moving pins 52. There is a pattern established of two parallel moving pins 52 followed by stationary pins 46 which are followed by a pair of moving pins 52 which are perpendicular relative to the adjacent pair of moving pins 52, followed by stationary pins followed by another pair of moving pins perpendicular to the aforementioned moving pins which are adjacent thereto, and so on. This combination of pins having the aforementioned orientation, in combination with the moving pins 52 being tangential relative to the longitudinal axis 42 creates the folding action which provides the homogeneous mixture of base sealant and pigments ejected from the ejection end 38 of the housing 28.

As best shown in FIG. 5, wherein the drive shaft 44 and moving pins 52 are shown in isolation, the drive shaft 44 includes a plurality of recessed grooves 54 extending tangentially relative to the drive shaft 44 and being disposed along the length of the drive shaft 44. Each of the moving pins 52 includes a medial portion 56 mounted on one of the recessed grooves 54 thereby disposing each of the pins 52 tangentially relative to the drive shaft 44 and longitudinal axis 42. The pins 52 can be welded or otherwise mounted fixedly on the drive shaft 44 by means well known in the art.

Referring to FIG. 3, each of the moving pins 52 includes a pair of distal end portions 58 disposed adjacent to an inner surface 60 of the housing 28. The inner surface 60 of the housing 28 defines the passageway 40. Each of the distal end portions 58 of the moving pins 52 are convexly contoured to approximate a contour of the inner surface 60, thereby allowing for closer proximation of the distal end portions 58 to the inner surface 60. Alternatively, at least some of the moving pins 52 can include wipers 62, in the form of rubber tips or the like, as shown in FIG. 5, for sweeping against the inner surface of the housing 28 to further ensure mixing of the volume of liquid flowing along the inner surface between the stationary pins 46. In this manner, just as the offset moving pins 52 ensure against columns of liquid flowing along the drive shaft 44 without being folded into the remainder of the liquid, the wipers 62 can help ensure that adhesion of the flowing liquid to the inner surface 60 of the housing 28 is disrupted.

Figure 6:
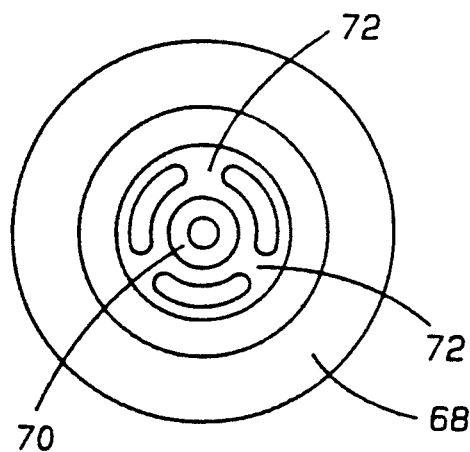
FIG. 6 is a cross-sectional view taken substantially along lines 6—6 of FIG. 3.
Figure 7:
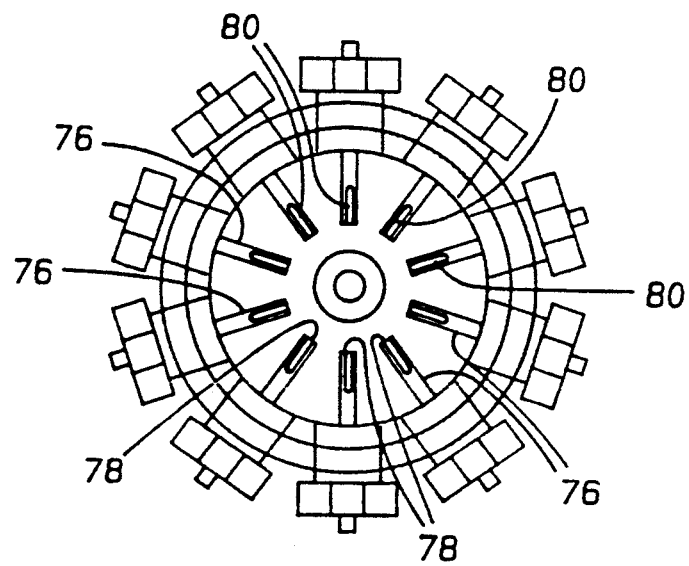
FIG. 7 is a cross-sectional view taken substantially along lines 7—7 of FIG. 3.

The drive shaft 44 includes one dowel pin end portion 64. Furthermore, the drive shaft 44 includes a threaded end portion 66 which attaches to the prime mover drive shaft 45. The housing 28 includes a nozzle end member 68 threadably connected to the second portion 36 and including the ejection end portion 38. The nozzle end member 68, as shown in FIG. 6, includes an inner webbing 70 which supports a shaft support ring 72. The dowel pin end portion 64 is mounted within bearing 74 which allow rotating movement of the drive shaft 44 relative to the nozzle end member 68. The threaded end portion 66 is operatively connected to a drive motor of the type well-known in the art for nozzles having drive shafts extending therethrough through the prime mover shaft 45.

The nozzle assembly 24 further includes an additive injecting mechanism, as mentioned above, for injecting a band of at least one additive liquid into the base liquid flowing through the passageway 40 along a radius of the passageway relative to the longitudinal axis 42. The material injecting mechanism is in the form of a tube attachment 34 mounted between the conduit 22 and the inlet end 30 of the housing 28. The additive injecting mechanism 34 includes one or more hollow tube members 76 extending from the inner surface 60 of the housing 28 radially inwardly towards the longitudinal axis 42. Each of the hollow tube members 76 have a plugged end portion 78. At least one opening or slot 80 extends along a length of each tube member 76 defining a liquid flow outlet for releasing a band-shaped outlet flow of liquid therefrom into the liquid flowing through the passageway 40. If the opening 80 is an elongated slot, then a continuous band of liquid is added to an entire length of the liquid flowing through the passageway 40. The opening 80 may be in the form of a single slot or a plurality of smaller openings. In either case, the slots allow for the release of a metered amount of additive liquid, (such as pigment) to a base material, (such as the sealant base) continuously as the base material flows thereby. Thusly, a specifically metered amount of pigment can be continuously released into the flowing volume of material thereby further contributing to the ability of the present invention to fold and thereby homogeneously mix the pigment additive to the sealant base.

Because of the highly viscous nature of the sealant base and the liquid pigment additives, the outflow of liquid from the slotted tubes assists in the dispersion of the liquids together. This is a more effective means of adding the pigment than merely adding a bolus amount of pigment to a single area of the volume of the sealant base and then attempting to mix the two together. Moreover, the combination of the tube members 76 which inject bands of pigments liquid into the sealant base liquid achieve a homogeneous mixing when combined with the folding mechanism of the stationary pins 46 combined with the moving pins 52.

The passageway 40 of the nozzle assembly 24 defines a predetermined volume equal to or an integer multiple of a predetermined volume of a container whereby a complete dose of liquid is mixed an equal amount. That is, the volume contained between the end 32 of the housing 28 and the ejection end 38 of the nozzle end portion 68 is designed such that an integer multiple of a full dose is being mixed at all times.

In operation, generally, a first liquid, such as a sealant base is pumped through the passageway 40 of the housing 28 having the axially rotatable drive shaft 44 supported by the housing 28 and extending through the passageway 40 along a length of the longitudinal axis 42 of the passageway 40. A second liquid is concurrently pumped into the passageway, the liquids being folded together as they flow through the passageway 40 while the pin configuration of the assembly prevents columns of unmixed material from flowing axially along the drive shaft 44 without being mixed.

More specifically, as the base sealant is pumped as a volume through the housing 28, pigments of various colors, chosen to be combined with the base sealant to perfect a desired combined color, are continuously injected into the flow of base sealant through openings 80 in hollow tube members 76. As the flow of base sealant and pigment, the pigment already being in bands or streams within the continuous flow of the base sealant, pass through the nozzle assembly 24, they are folded by the moving pins 52 about the stationary pins 46. Due to the continuous folding of the base sealant and pigments as they flow along the length of the passageway 40, a homogeneous mixture of the base sealant and pigment are ejected from the ejection end portion 38.

The aforementioned method and assembly provide solutions to the problems inherent in the prior art. Because injection of pigment and mixing are accomplished proximate to the ejection of the homogeneous mixture into a container, clean up of the assembly is limited to the nozzle assembly 24 per se thereby requiring much less waste of material for clean up purposes as compared with prior art assemblies. The assembly achieves adequate mixing of highly viscous liquids by a folding procedure, limiting shearing forces and thereby not elevating the temperature of the materials which would otherwise cause physical and chemical alterations to the materials. Finally, the assembly achieves point of packaging pigmentation which has long been desired for sealant production facilities and the like. Of course, the present invention can be utilized to mix other highly viscous fluids, especially where a small amount of additive must be homogeneous dispersed throughout a large amount of a base material, both materials being highly viscous liquids.

The invention has been described in an illustrative manner, and it is to be understood that the terminology which has been used is intended to be in the nature of words of description rather than of limitation.

Obviously many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A nozzle assembly (24) for filling a container with a homogeneous mixture of viscous liquids, said assembly comprising:

a housing (28) including an inner passageway (40) extending therethrough defining a longitudinal axis (42) of said housing (28);

an axially rotatable drive shaft (44) supported by said housing (28) and extending through said passageway (40) along said longitudinal axis (42); and folding means for folding the liquids flowing through said passageway (40) while preventing columns of unmixed liquid from flowing axially along said drive shaft (44); said folding means including stationary pin members (46) disposed along said passageway (40) and extending into said passageway (40) from said housing (28) and moving pins (52) attached to said drive shaft (44) at respective attachment points and extending into said passageway (40), said moving pins (52) each being mounted nonradially on said drive shaft (44) in a plane extending generally tangential to said drive shaft (44) at said respective point of attachment.

2. An assembly as set forth in claim 1 wherein said drive shaft (44) defines a length thereof along said longitudinal axis (42), said moving pins each having a proximal next adjacent moving pin (52) extending substantially parallel thereto and a distal next adjacent moving pin (52) extending substantially perpendicular thereto.

3. An assembly of claim 2 wherein each of said moving pins (52) is axially offset relative to both the proximal and distal next adjacent moving pins (52) along said length of said drive shaft (44).

4. An assembly of claim 3 wherein said drive shaft (44) includes a plurality of recessed grooves (54) extending tangentially relative to said drive shaft (44) and being disposed along said length of drive shaft (44), each of said moving pins (52) including a medial portion (56) mounted on one of said recessed grooves (54) at said attachment point.

5. An assembly of claim 2 wherein said stationary pin members (46) are each disposed along said housing (28) between one of said moving pins (52) and the respective distal next adjacent moving pin (52).

6. An assembly of claim 5 wherein each of said moving pins (52) includes a pair of distal end portions (58) disposed adjacent to an inner surface (60) of said housing (28), said inner surface (60) defining said passageway (40), each of said distal end portions (58) being convexly contoured to approximate a contour of said inner surface (60) thereby allowing for close proximations of said distal end portions (58) to said inner surface (60).

7. An assembly of claim 6 wherein at least some of said moving pins (52) include wiper means (62) for sweeping against said inner surface of said housing (28).

8. An assembly of claim 1 including at least one material injecting means (34) for injecting a band of at least one liquid into the liquid flowing through said passageway (40) along a radius of the passageway relative to said longitudinal axis (42).

9. An assembly of claim 8 wherein said material injecting means (34) includes a hollow tube member (76) extending from an inner surface (60) of said passageway (40) and radially inwardly towards said longitudinal axis (42), said tube member (76) having a plugged end portion (78) and at least one opening (80) along a length thereof defining a liquid flow outlet for releasing a band-shaped outlet flow of liquid therefrom into the liquid flowing through said passageway (40) whereby a continuous band of liquid is added to an entire length of the liquid flowing through said passageway (40).

10. An assembly of claim 9 wherein said material injecting means (34) includes a plurality of tube members (76) arranged circumferentially about said passageway (40) with each of said tube members (76) including an opening (80) extending along a length thereof collectively defining a liquid flow outlet thereby releasing a length of streams of liquid into the liquid flowing through said passageway (40).

11. An assembly of claim 1 wherein said drive shaft (44) includes a dowel pin end portion (64) and said housing includes an ejection end portion (38) including drive shaft support means (72) for supporting said dowel pin end portion (64) while allowing for rotation of said drive shaft (44) relative to said housing (28).

12. An assembly of claim 1 wherein said passageway (40) defines a predetermined volume equal to a predetermined container volume whereby a complete dose of liquid is mixed an equal amount.

13. A liquid injecting assembly (10) for simultaneously mixing and injecting at least one highly viscous liquid into a second highly viscous liquid, said assembly (10) comprising:

a first liquid source (12);

at least one second liquid source (14);

nozzle means (24) for injecting a mixture of said liquids into a container (26);

conduit mans (20, 22) for conveying liquids from said first and second liquid sources (12, 14) to said nozzle means;

pumping means (16, 18) for pumping the liquids to said nozzle means and out thereof, said nozzle means (24) including a housing (28) including an inner passageway (40) extending therethrough defining a longitudinal axis (42) of said housing (28);

an axially rotatable drive shaft (44) supported by said housing (28) and extending through said passageway (40) along said longitudinal axis (42); and folding means for folding the liquids flowing through said passageway (40) while preventing columns of unmixed liquid from flowing axially along said drive shaft (44); said folding means including stationary pin members (46) disposed along said passageway (40) and extending into said passageway (40) from said housing (28) and moving pins (52) attached to said drive shaft (44) at respective attachment points and extending into said passageway (40), said moving pins (52) each being mounted nonradially on said drive shaft (44) in a plane extending generally tangential to said drive shaft (44) at said respective point of attachment.

14. A method of filling a container with a homogeneous mixture of viscous liquids includes the steps of:

pumping a first and second liquid through a passageway (40) of a housing (28) having an axially rotatable drive shaft (44) supported by the housing (28) and extending through the passageway (40) along a length of a longitudinal axis (42) of the passageway (40); and folding the liquids flowing through the passageway (40) by sweeping a radially offset pin member (52) attached to the drive shaft (44) in an arc about the longitudinal axis (42) while preventing columns of unmixed material from flowing axially along the drive shaft (44).

15. A method of claim 14 further including the steps of injecting a band of at least one liquid into the liquid flowing through the passageway (40) along a radius of the passageway (40) relative to the longitudinal axis (42) of the passageway (40).

* * * * *